July 20, 1937. H. G. METCALF ET AL 2,087,441
LAMINATED FIBROUS STRUCTURE AND METHOD OF PRODUCING SAME
Filed June 17, 1935
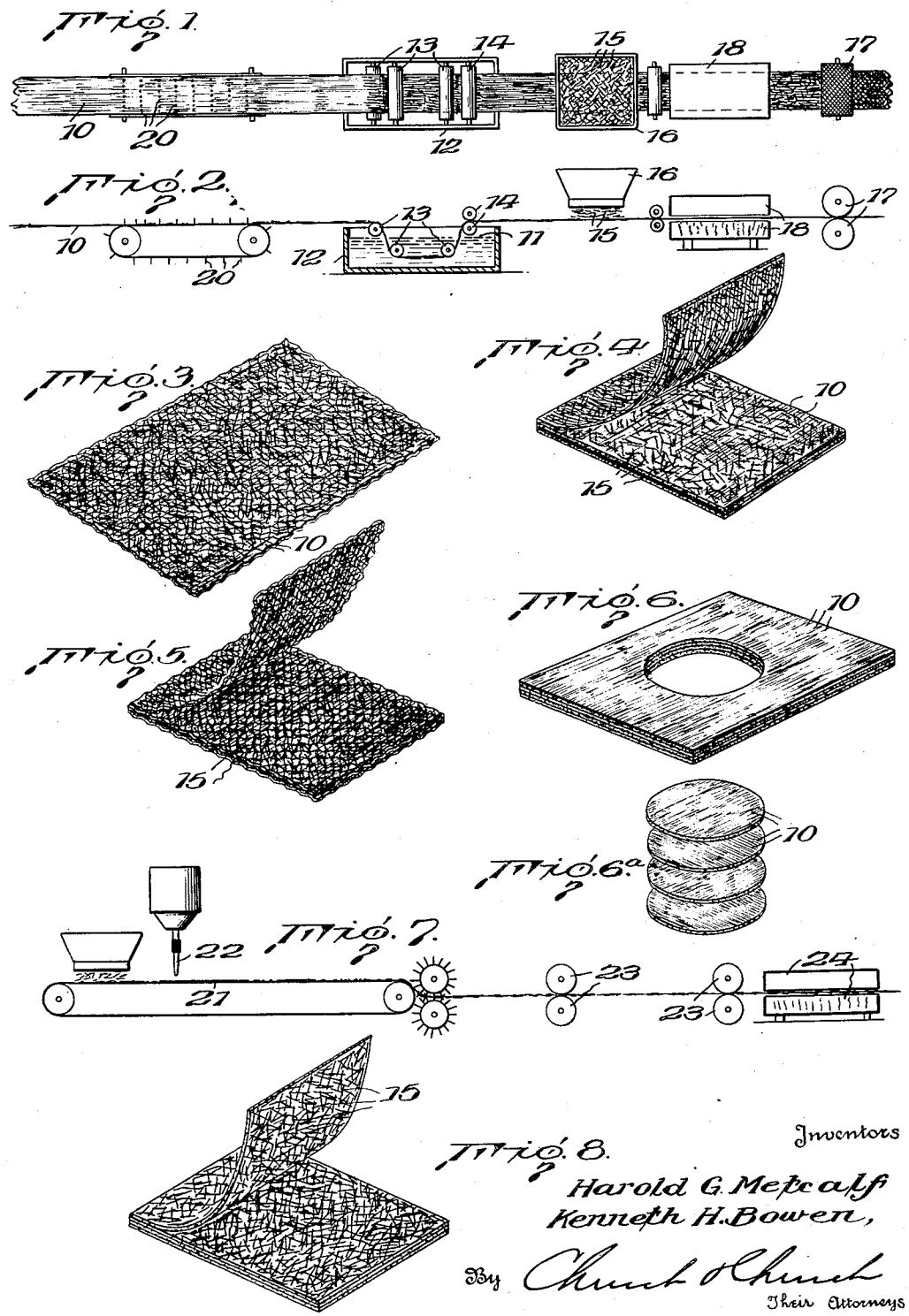
Inventors
Harold G. Metcalf
Kenneth H. Bowen,
By Church & Church
Their Attorneys Patented July 20, 1937

2,087,441

UNITED STATES PATENT OFFICE 2,087,441

LAMINATED FIBROUS STRUCTURE AND METHOD OF PRODUCING SAME

Harold G. Metcalf and Kenneth H. Bowen, Auburn, N. Y., assignors to Columbian Rope Company, Auburn, N. Y., a corporation of New York Application June 17, 1935, Serial No. 27,080

7 Claims. (Cl. 154—2)

This invention relates to improvements in the production of fibrous structures and particularly to laminated vegetable fiber articles and the method of making the same.

One object is to provide a comparatively inexpensive method of combining a mass of fibers in a laminated fibrous structure whose characteristics as to density and resiliency can be readily controlled and in which the ability of the fibers to take various stresses can be varied as desired.

A further object is to provide a method of producing laminated fiber structures wherein the fibers can be prepared in sheet-like form, representing an intermediate stage in the production of the finished structure or article, and such sheets later laminated to form the complete structure.

In its preferred form, the proposed method consists in arranging a multiplicity of comparatively long fibers in sheet or tape-like form with the several fibers in parallelism but detached from each other, then applying a binder to securely unite the fibers together, after which comparatively short fibers are deposited on at least one surface of the sheet or strip. These shorter fibers are united or secured to the sheet or strip by the binder and are applied thereto without special attention to their disposition thereon relatively to the assembled parallel fibers but a majority of them are found to be disposed transversely to said parallel fibers and, consequently, prevent rupture of the sheet or strip by transverse strains. After the short fibers have been thus applied the length of material may then be run through between a pair of knurled rolls adapted to exert sufficient pressure on the material to crimp the short fibers and impress portions thereof, so to speak, in the mass of longer fibers. This imparts compactness to the mass; increases the adhesion of the short fibers to the longer fibers which might be said to constitute a foundation; and lends to the strength of the mass as a whole. The sheet material is then cut to desired length and shape and laminated, the long fibers of alternate layers preferably being disposed at an angle to those of the other layers. The several laminations are likewise secured together with the binder, additional binder being applied if desired or necessary. The laminated structure may also be treated with heat and pressure, as by molding, if desired, or articles may be cut or punched from the laminated material.

With these and other objects in view, the invention consists in certain details of construction and combinations and arrangements of parts, all as will hereinafter be more fully described and the novel features thereof particularly pointed out in the appended claims.

In the accompanying drawing illustrating the preferred method of producing the present laminated structure, and a section of material produced by that process—

Figure 1 is a top plan view, the apparatus being shown more or less diagrammatically;

Fig. 2 is a side elevation;

Fig. 3 is a perspective view of a short length of material illustrating the crimping effect of the knurled rolls;

Fig. 4 is a perspective view of a section of laminated structure, a portion of one of the layers being shown partly detached to facilitate illustration;

Fig. 5 is a similar view of a laminated structure wherein the short fibers have been omitted in carrying out the process;

Fig. 6 shows a section of laminated material from which a circular body has been punched;

Fig. 6a shows the several laminations of said circular body detached from one another;

Fig. 7 is a diagrammatic illustration of apparatus for preparing a "sheet" material from short length fiber; and Fig. 8 is a perspective view of a section of material formed by the apparatus of Fig. 7.

In the preferred method, a group of fibers 10, usually in sliver formation, are passed through machines which substantially effect a combing action on the fibers with the result that they are brought into substantial parallelism with one another. This arrangement of the fibers may be obtained on machines commonly used in the preparation room of rope, or so-called jute, factories, or the like. In the drawing, such apparatus is indicated diagrammatically by the pins 20.

After the fibers have thus been prepared, and while still detached one from the other, they are treated with a suitable binder such as a latex cement, casein or animal glue, or a thermo-setting resin binder. This application of the binder may be accomplished by passing the length of fibers through a bath of the binder, indicated at 11, in a receptacle 12. Proper guide rolls 13 should, of course, be provided and, if necessary, squeeze rolls 14 may be used to remove excess binder from the fibers as they emerge from the bath.

The binder securely cements the fibers together, but, as the fibers, at this point, are all disposed in one and the same direction, the material is preferably reinforced against strains transversely of the fibers by subsequently applying, to one or both surfaces thereof, additional fibers 15. These fibers 15, which should be comparatively short, or at least of a length not exceeding the width of the web formed by fibers 10, may be dusted on to the surface of the then fabricated fibers or web from a receptacle 16. These fibers 15 are preferably simply deposited promiscuously on said surface and, in most instances, they will be disposed transversely of fibers 10. If said short fibers are applied to the surface of fibers 10 before the binder 11 has lost its tackiness, they will, of course, adhere to fibers 10, but, if desired, additional binder may be used, either by applying it to fibers 15 themselves or to fibers 10.

After fibers 15 are combined with the fibers 10, which latter might be said to constitute a base, the body thus formed by the two sets of fibers is preferably passed between two knurled rolls 17 or squeeze rolls or heated drums, pressure being applied on said body by said rolls to effect a crimping of the fibers. This crimping action tends to impress the short fibers into the base fibers 10 with the result that the several fibers are more or less interlocked, thus further lending to the production of a substantially unitary mass. The crimping action also gives a corrugated product which, of course, lends to the strength of the material.

To facilitate setting of the binder, suitable drying apparatus may be used to project a blast of air against the material, or it may run through an oven or merely air dried. In the present illustration, such apparatus is indicated at 18, interposed between the point at which the short fibers are applied to fibers 10 and the point where the material passes between knurled rollers 17.

The material thus prepared is highly adapted for the production of laminated fiber articles. As shown in Fig. 4, a plurality of sections or sheets of the material have been laminated with the fibers 10 of alternate layers disposed at an angle to those of the remaining layers. In this instance, the crimping action above referred to has been used, but a laminated structure, wherein the short fibers and the crimping have been omitted, is illustrated in Fig. 5. When the material is to be laminated immediately upon its formation, the drying apparatus may be omitted, although additional binder may be applied during the laminating step. For some articles where it is desirable to omit the short fibers 15, the sheets or sections would be laminated as illustrated in Fig. 5. With the angular disposition of fibers 10 of alternate layers, each lamination would reinforce contiguous layers against transverse rupture.

Laminated bodies such as illustrated in Figs. 4 and 5 are highly adapted to the production of any number of articles which may be formed therefrom as by being punched therefrom, or the bodies may be molded from said bodies, particularly when thermo-setting resins are employed. In some instances, it may be desirable to place the body of laminated material, either before or after formation of the desired article, but before the binder has dried, in a mold under pressure and permit it to dry therein. This is not essential, but with some binders the strength of the latter is increased. Where latex, in a vulcanizable compound, is used as the binder, heat may be applied to the mold to vulcanize the binder.

If desired, the "sheet" material used in building up the laminated structure may be made of comparatively short fibers. For instance, as shown in Fig. 7, the fibers can be fed to an endless traveling surface 21, preferably a belt or conveyor, forming a layer of substantially uniform thickness to which a binder is applied, as by spraying, from spray apparatus indicated at 22. The sheet of fibers thus formed passes from the belt 21 between one or more pairs of compression rolls 23. If desired, heat may be applied, as indicated by the heating chamber 24 through which the traveling web or sheet passes or, as before indicated, the rolls 23 may be heated drums. The material, thus formed in sheets, may be cut in sections of suitable length and laminated, as illustrated in Fig. 8, and articles produced from said laminated material as desired. Where the drying is effected before lamination, additional binder would, of course, be applied to the sheets, but this would not be necessary where drying of the sheet, as formed, was omitted. The material may also be laminated by winding a length thereof on a suitable revolving support.

In each instance, the finished article may be produced at a comparatively low cost, but, nevertheless, it will be of great strength, particularly where the short fibers and crimping action are used in combination with the relatively long, parallel base fibers 10. The short fibers disposed at an angle to the long fibers give the same strengthening or reinforcing effects as are obtained in interwoven materials, but due to the mode employed for associating the two groups of fibers, as compared with weaving, production costs are materially reduced.

It will, of course, be appreciated that in lieu of fibers, fibrous elements, such as threads or spun yarns, may be used, although, as described, a long, strong fiber is preferred for the base fibers 10.

What we claim is:

1. A laminated fibrous material composed of a plurality of laminations each consisting of a multiplicity of vegetable fiber elements arranged in parallelism, a resilient bonding material uniting the elements of each lamination and uniting the several laminations into a unitary mass, and a body of comparatively short fibers promiscuously disposed and secured between each two contiguous layers of fiber elements to prevent rupture of said fiber element layers by strains exerted transversely of said elements.

2. A laminated fibrous body composed of a plurality of superposed layers of fibers, each layer comprising a multiplicity of fibers arranged in parallelism, and a plurality of short fibers disposed transversely of one face of the parallel fibers, a binder material securing the parallel fibers and short fibers of each layer together in a unitary mass, and the fibers on the face of each layer being impressed into said layer to interlock them with the group constituting said layer, the several layers being secured together into a unitary mass by said binder material.

3. A laminated fibrous body composed of a plurality of superposed layers of fibers, each layer comprising a multiplicity of fibers arranged in parallelism, and a plurality of short fibers disposed transversely of one face of the parallel fibers, a binder material securing the parallel fibers and short fibers of each layer together in a unitary mass, and the fibers on the face of each layer being impressed into said layer to interlock them with the group constituting said layer, the parallel fibers of successive layers being disposed at an angle to one another and the several layers being secured together into a unitary mass by said binding material.

4. The method of producing a laminated fibrous structure which consists in arranging a plurality of elongated fibers in substantial parallelism, applying a binder material to said fibers and uniting them into a unitary body of tape-like formation, applying comparatively short fibers to a surface of said body, said short fibers being promiscuously disposed upon and united to said body by said binder material, and laminating lengths of said fiber body into sheet-like form.

5. The method of producing a fibrous structure which consists in arranging a plurality of elongated fibers in substantial parallelism, applying a binder material to said fibers and uniting them into a unitary body of tape-like formation, applying comparatively short fibers to a surface of said body, said short fibers being promiscuously disposed upon and united to said body by said binder material.

6. The method of producing a laminated fibrous structure which consists in arranging a plurality of elongated fibers in substantial parallelism, applying a binder material to said fibers and uniting them into a unitary body of tape-like formation, applying comparatively short fibers promiscuously upon one surface of said body, said short fibers being united to said body by said binder material, and laminating lengths of said fiber body into sheet-like form with the elongated fibers of alternate layers disposed at an angle to like fibers of the remaining layers.

7. The method of producing a laminated fibrous structure which consists in arranging a plurality of elongated fibers in substantial parallelism, applying a binder material to said fibers and uniting them into a unitary body of tape-like formation, applying comparatively short fibers to one surface of said body, said short fibers being united to said body by said binder material, crimping the short length fibers into said body, and laminating lengths of said fiber body.

HAROLD G. METCALF.
KENNETH H. BOWEN.